Dec. 11, 1962   B. A. NEAL ETAL   3,067,434
PORTABLE SHOWER

Filed Nov. 14, 1960   2 Sheets-Sheet 1

INVENTOR.
BYRON A. NEAL
CECIL R. NEAL JR.
BY Robert E. Beidenthal
ATTORNEY

Dec. 11, 1962   B. A. NEAL ET AL   3,067,434
PORTABLE SHOWER

Filed Nov. 14, 1960   2 Sheets-Sheet 2

INVENTOR.
BYRON A. NEAL
CECIL R. NEAL JR
BY Robert E Breidenthal
ATTORNEY

United States Patent Office 3,067,434
Patented Dec. 11, 1962

3,067,434
PORTABLE SHOWER
Byron A. Neal, 8101 W. Murdock, Wichita, Kans., and Cecil R. Neal, Jr., 2534 E. Hazelwood, Phoenix, Ariz.
Filed Nov. 14, 1960, Ser. No. 69,188
4 Claims. (Cl. 4—147)

This invention relates to new and useful improvements in portable showers, and more specifically this invention pertains to a shower of portable nature provided with means for pressuring the water and heating the same in a safe and efficient manner.

The principal object of the invention is to provide a safe, truly portable and compact shower that can be swiftly changed from a packed condition to its operative condition in a simple and efficacious manner.

Another object of the invention is to provide a convenient and efficient system for heating the water supply, such system being safe insofar as the generation of excessive pressures are concerned, and such system being such as to render the likelihood of the water dispensed by the shower being excessively or dangerously hot very unlikely.

Briefly, the invention relates to shower apparatus comprising a water supply vessel having a normally-closed water inlet, means for introducing a gas under pressure into said vessel to maintain a superatmospheric pressure therein, a valved outlet conduit provided with a shower nozzle communicating with the vessel, and means including a heater for circulating a heated fluid in heat exchange relation with the contents of the vessel.

Considered in a somewhat more restricted aspect, the invention has to do with shower apparatus comprising a water supply vessel having a normally closed water inlet, means for introducing a gas under pressure into said vessel to maintain a superatmospheric pressure therein, a valved outlet conduit provided with a shower nozzle communicating with the vessel, and means for circulating a heated fluid in heat exchange relation with the contents of the vessel, said last means comprising a burner and a heater coil adjacent thereto, a vertically extending tubular member in said vessel affording heat exchange between its interior and the surrounding contents of the vessel, said tubular member having an open lower end adjacent the bottom of the vessel, said heater coil having its opposite ends respectively connected to the upper end of the tubular member and the vessel adjacent the bottom of the latter.

Another aspect of the invention involves a portable shower apparatus comprising a housing, a water supply vessel mounted in the housing, means carried by the housing for introducing a gas under pressure into said vessel, a vertically extensible standard carried by the housing, a shower nozzle on the standard, a flexible and valved conduit connecting the bottom of the vessel to the nozzle, a panel hinged to the housing for swinging about a horizontal axis between a vertical position in which it is spaced from a side of the housing to a horizontal position in which its lower surface is essentially coplanar with the bottom of the housing, a curtain rod and a shower curtain carried thereby, said rod and curtain being of such size as to be selectively positionable in the space between the housing and the panel when the latter is in its vertical position, means for securing the curtain rod to the extensible standard, and means for selectively securing the panel in its vertical or horizontal positions.

The invention will be best understood upon reference to the accompanying drawings illustrative of a preferred embodiment thereof, wherein.

Figure 1:
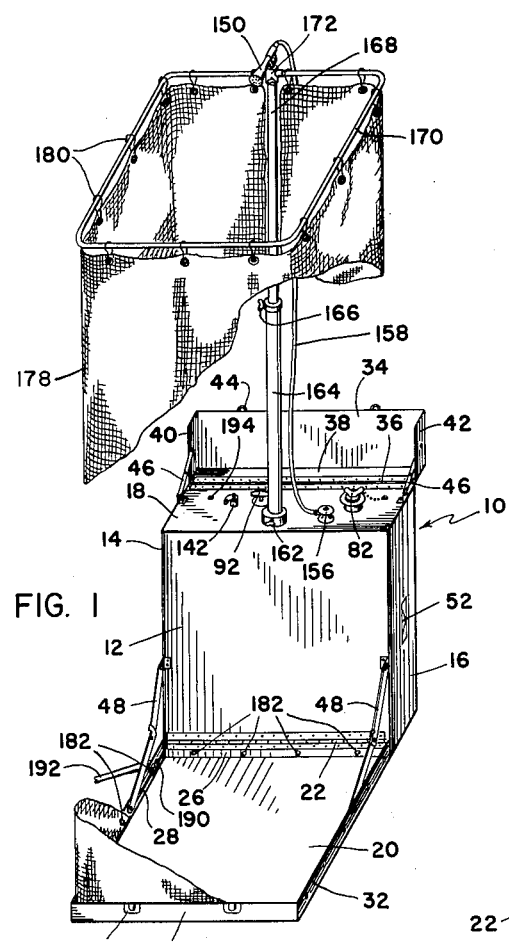
FIGURE 1 is a perspective view of the portable shower in operative condition, portions of the shower curtain being broken away.
Figure 2:
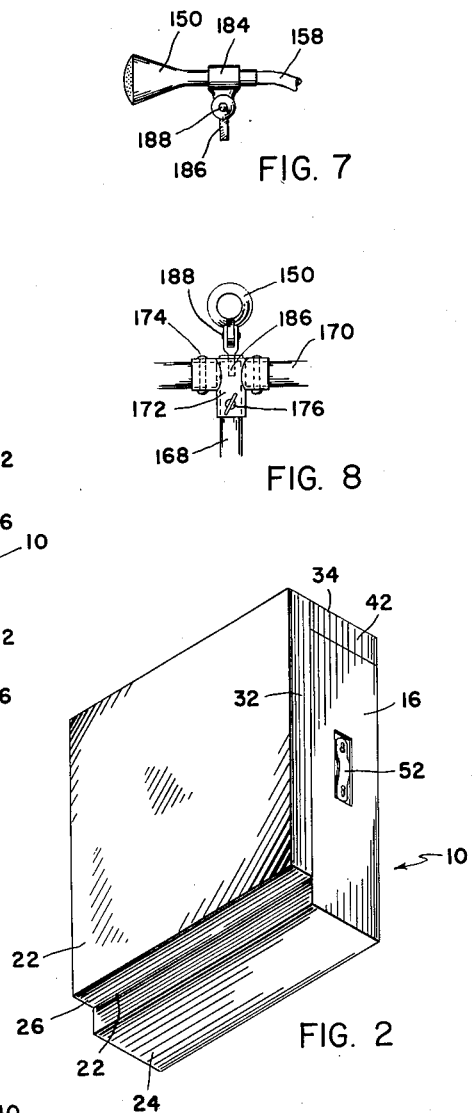
FIGURES 2 and 3 are perspective views of the portable shower in its packed or traveling condition taken from the front and rear respectively, with the latter view being on a reduced scale.
Figure 3:
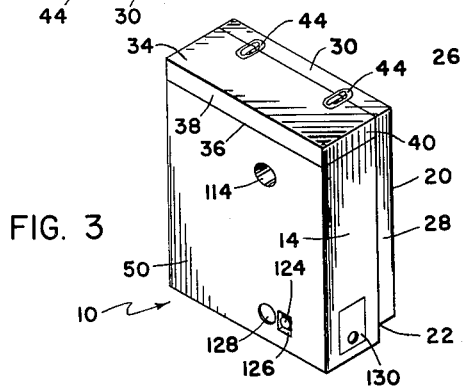

Proceeding to a consideration of the drawings, attention is first directed to FIGURES 1, 2 and 3, wherein the reference numeral 10 designates generally a housing comprising a front 12, sides 14 and 16, and a top 18.

A panel 20 is hinged at 22 to the front 12 adjacent the bottom 24 of the housing 10 (see FIGURES 2 and 3). The panel 20 has inturned or flanged peripheral portions 26, 28, 30, and 32, as shown, that cooperate to space the central portion of the panel 20 from the front 12 for a purpose to be presently explained.

A cover 34 is hinged at 36 along the edge of one of its depending peripheral portions 38, 40, and 42 in such a relationship that, when the cover 34 is in the position shown in FIGURES 2 and 3, it is spaced from the top 18 for a purpose shortly to become apparent.

Cooperating conventional fastening means 44 carried by the panel 20 and the cover 34 releasably secure such structures in the position shown in FIGURES 2 and 3. The cover 34 is releasably retained in the open position shown in FIGURE 1 by conventional toggle-type brackets or pivoted links 46. The brackets or links 46 limit upward swinging movement of the cover 34, and also prevent closure of the cover 34 until the central part of each of such brackets 46 is raised past a dead center alignment. A similar pair of brackets 48 connect the portions 28 and 32 of the panel 20 to the front wall 12; whereby the panel 20, when in the position shown in FIGURE 1, serves to help hold the housing 10 erect when the apparatus rests upon a generally planar supporting surface. The panel 20 and the bottom 24 are essentially coplanar when the former is in its open or horizontal position shown in FIGURE 1.

The housing 10 includes a back wall 50, with the side wall 16 being provided with a carrying handle 52, which is preferably of the recessed type, as shown.

The structure thus far described can be metallic, and is preferably made of aluminum in the interest of strength and lightness of weight.

Figure 4:
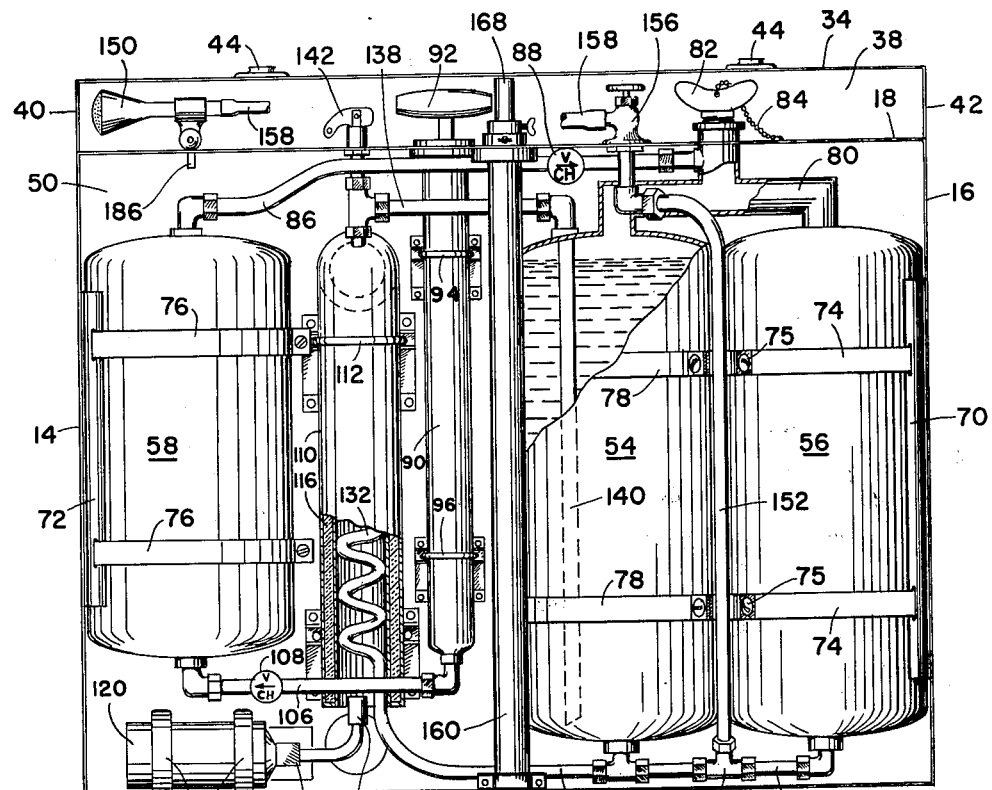
FIGURE 4 is a front elevational view of the housing and its contents with the front wall and the panel being removed.
Figure 5:
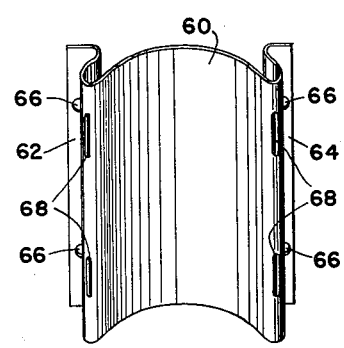
FIGURE 5 is a perspective view on a reduced scale of the type bracket used in mounting the air and water vessels.
Figure 6:
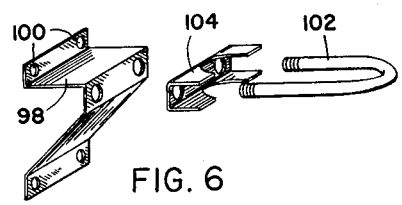
FIGURE 6 is an exploded perspective view of the type brackets used in mounting the pump and the heater shield; and, FIGURES 7 and 8 are fragmentary detail views of the mounting structure for the nozzle and the curtain rod at the top of the extensible standard.

Attention is now directed to FIGURES 4, 5, and 6, wherein the numerals 54 and 56 designate a pair of cylindrical water vessels, and wherein the numeral 58 designates an air vessel or accumulator. The vessels 54, 56, and 58 are mounted within the housing 10 by means of brackets such as the one shown in FIGURE 5. The latter comprises a sheet metal construction having a cylindrical central portion 60 with S-shaped flange or side portions 62 and 64 that are provided with mounting openings 66. The structure is provided with slots 68 adapted to receive securing straps therethrough. Brackets 70 and 72 of the character shown in FIGURE 5 are fixed to the walls 16 and 14 for mounting the vessels 56 and 58, respectively. Straps 74, which can be of thin stainless steel, embrace the vessel (passing through the slots in the bracket 70, as shown) and have their free ends secured as shown at 75. The vessel 58 is similarly mounted on bracket 72 by straps 76, while the vessel 54 is also mounted in a like fashion by straps 78 carried by a bracket (not shown) fixed to the rear wall 50.

The vessels 54 and 56 are each connected at the top to an inverted Y-shaped filler pipe 80, the top of which is closed by a threaded filler plug 82 carried by a safety chain 84 to prevent loss when the tanks 54 and 56 are being filled through the pipe 80. Conduit means including a pipe 86 communicates by means of appropriate fittings, as shown, between the pipe 80 and the top of the air vessel 58, it being noted that a check valve 88 in the pipe 86 permits the fluid flow only from the vessel 58 to the pipe 80.

A manual air pump 90 is mounted in the housing 10 with the actuating handle 92 extending above the top 18, as shown. The body of the pump 90 is secured to the rear wall 50 of the housing 10 by means of brackets 94 and 96. The structure of the brackets 94 and 96 is shown in FIGURE 6, wherein the numeral 98 shows a U-shaped support provided with openings 100 for wall attachment. The bracket includes a U-bolt 102 that extends through aligned openings provided in a channel-shaped adapter 104 and the support 98, and the bracket is assembled with nuts (not shown). The discharge end of the pump 90 is connected by a pipe 106 to the bottom of the air vessel 58 through a check valve 108, as shown. The pump 90 can be readily operated by manual vertical reciprocation of handle 92 to generate a superatmospheric pressure with the vessel 58, with such pressure being communicated to the interior of the vessels 54 and 56. Also mounted within the housing 10 is a heater shield 110, such shield being mounted upon the rear wall 50 by means of brackets 112 of the type illustrated in FIGURE 6. The heater shield 110 is L-shaped so that its upper end communicates through the back wall 50 as indicated at 114 in FIGURE 3 to afford venting. The heater shield 110 is of double-walled metallic construction (steel being preferred), with the space between the double-walls being filled with an insulative material 116, such as spun glass, asbestos, or the like.

A pair of spring clips 118 are fixed to the bottom wall 24 and releasably hold a bottle of L.P.G. fuel 120. The bottle 120 is provided with a burner 122, the output of which is controlled by a valve 124. Access to the valve 124 and to the burner 122 for lighting the latter is provided by suitable openings 126 and 128 in the back wall 50, as shown. Such openings 126 and 128 also allow air to enter the housing for combustion purposes. The bottle 120 and its attached burner 122 can be removed and replaced through an apertured access door 130 hinged to the sidewall 14 (see FIGURE 3).

A tubular and convoluted heater coil 132, preferably of copper is disposed within the heater shield 110, so as to be heated by the upward passage of combustion products from the burner 122 through the shield 110. The lower end of the heater coil 132 is connected by pipes 134 and 136 and appropriate fittings to the bottoms of the vessels 54 and 56, as shown. The upper end of the coil 132 extends through the shield 110 and is connected by means including a pipe 138 to a heat exchanger tube or tubular member 140 in the vessel 54. The tubular member 140 is preferably copper so as to facilitate the exchange of heat therethrough, and extends from a position adjacent the top of the vessel 54 to a position adjacent the bottom of the vessel 54, the lower end of the tube 140 being open-ended.

A combined pressure-relief valve and manually-operable bleeder valve 142 is connected to the pipe 138 by a branch conduit, as shown, whereby pressure within the coil 132 or the vessels 54 and 56 in excess of a predetermined value is automatically vented. Such valve 142 can be manually opened to release air or other gases trapped in the coil 132, pipe 138, and tubular member 140, it being noted that the valve 142 is adjacent the upper end of such listed elements, and that such bleeding of gas is facilitated by the superatmospheric pressure applied within the system by the pump 90.

The described heating system will cause circulation from the bottom of one or both of the vessels or tanks 54 and 56 to the lower end of the heater coil 132, thence upwardly through the latter, and finally to the lower portion of the vessel 54 through the tubular member 140. During passage of the tubular member 140, heat exchange with water in the vessel 54 ambient to the tubular member 140 is realized. Such heat exchange tends to cool water or to condense water vapor in the tubular member 140 so as to facilitate water circulation by the difference in density of the fluids in the heater coil 132 and the tubular member 140.

Water in the vessels 54 and 56 is delivered to a shower nozzle 150 by a valved conduit system that comprises a pipe 152 that is connected between a T 154 in the pipe 136 and a manual valve 156 mounted on the top 18 of the housing 10.

A flexible rubber tubing 158 connects the valve 156 to the nozzle 150. Water from the vessels 54 and 56 is mixed and delivered as required to the nozzle 150 under the control of the valve 156 and under the pressure that can be applied to the contents of the vessels 54 and 56 upon manipulation of the handle 92 of the pump 90. Such mixing of the water from the vessels 54 and 56 lessens any likelihood of the water delivered to nozzle 150 being too hot, as only the water in vessel 54 is directly heated.

The apparatus includes an extensible standard that preferably comprises a set of telescoping tubular elements the largest of which, indicated at 160, is mounted in the housing 10 and is secured to the bottom 24 and the top 18, as shown, it being noted that the upper end of the element 160 extends to just above the top 18 and is provided with an attached collar and lock screw 162 for releasable engagement with a tubular element 164 extensibly received therein. The element 164 is also provided with a collar and lock screw 166 that releasably engages an element 168 slidable therein.

Figure 7:
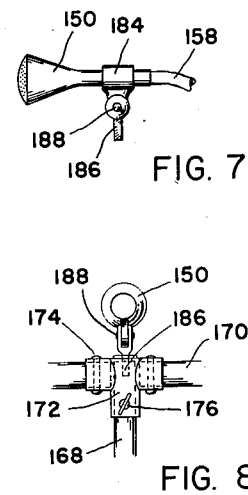
Figure 8:
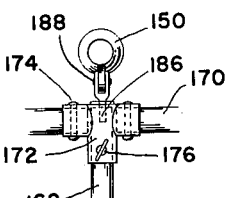

A curtain rod 170 is provided which is in the form of a rectangular loop that is closed by a T-shaped fitting 172 (see FIGURES 7 and 8) fixed thereto by rivets 174, as shown. The depending leg of the fitting 172 is hollow and releasably receives the upper end of the element 168, a lock screw 176 being provided to secure the curtain rod 170 to the element 168 in assembled relation.

A shower curtain 178 is supported by the curtain rod 170 in conventional fashion by suspension loops 180 slidable on the rod 170. The curtain 178 has its free vertical edges adjacent the T fitting 172, with the lower peripheral edges of the curtain 178 being releasably secured by a plurality of spaced snap fasteners 182 or the like to inside surfaces of the portions 26, 28, 30, and 32 of the panel 20. Sufficient slack and flexibility of the curtain 178 enables a person to enter or leave the shower upon moving the upper part of a free vertical edge on the rod 170 without unfastening any of the fasteners 182.

The nozzle 150 is carried by a support 184 that includes a stub 186 of square cross section and an intermediate friction-type pivot 188. The stub 186 removably fits into a complementary recess or opening in the T fitting 172, as shown, whereby it is held erect and against rotation about its vertical axis, with the pivot 188 enabling the user of the shower manually to adjust the nozzle 150 about a horizontal axis to suit his pleasure. The pivot 188 is of the frictional-type and will hold an adjusted position of the nozzle 150 until subsequent manual adjustment is made.

A drain opening 190 is provided in the portion 28 of the panel 20, which in turn is optionally provided with a removable rubber drain hose 192 frictionally fitted therein.

Changing the apparatus from operating condition (shown in FIGURE 1) to traveling condition is hereinafter explained in connection with FIGURE 1. The stub 186 is removed from the fitting 172 and inserted in an opening 194 in the top 18 with tube 158 being folded about on the top 18 (see FIGURE 4). The drain hose 192 is removed from the opening 190 and placed on the panel 20. The screw 176 is loosened, and the curtain rod 170 removed from the element 168, and then lowered directly without rotation onto the panel 20 with the curtain 178 being folded in any desired manner on the panel 20, such as being allowed to drop onto the panel 20 with accordian-like folds therein.

The screws 162 and 166 are loosened and the extensible standard or support comprised of the elements 160, 164, and 168 is collapsed or lowered to the position shown thereof in FIGURE 4. The cover 34 can then be lowered to closed position upon suitable manipulation of the braces 46. The panel 20 is raised to its vertical or closed position upon release of the braces 48 by raising the center portions of the latter, and the cooperating fastening means 44 latched or fastened as shown in FIGURE 3. The entire apparatus shown in FIGURE 1 is then neatly contained in the housing 10 and the spaces between the cover 34 and the panel 20, and no parts protrude so as to be liable to damage or to cause injury. Also, the openings permit inspection to make sure that the burner 122 is out, while preventing any dangerous accumulation of gases. The reverse transition is accomplished quite obviously by simply reversing the described procedure.

Of course the burner 122 should be extinguished by use of the valve 124 before closing the apparatus, unless immediate reuse is contemplated. In this connection, the heating operation can be largely performed before the apparatus is placed in operative condition.

Changing the apparatus from the traveling position to the operating position entails substantially a reversal of the procedure outlined above.

The illustrated and described embodiment of the invention is susceptable to numerous variations without departing from the spirit thereof.

It has been found that apparatus of the character illustrated and described can be entirely practical for its purpose and yet be of such size and weight (even when charged with water) as to be easily carried by hand or loaded into an automobile trunk or the like. A maximum overall height of the apparatus (when packed) of two and one-half feet has been easily realized. It has been found that the apparatus dispenses water with such efficiency and economy that a total water capacity of four gallons can suffice for several showers.

The foregoing detailed description has been to convey a full and complete understanding of the principles of the invention and narrowness in inventive scope should not be thereby imputed; rather, the measure of the invention should be ascertained from the appended claims.

We claim:
1. In a portable shower structure, the improvement comprising a generally rectangular housing, an air tank and a water vessel in the housing, a pump for forcing air into the air tank, a pressurizing conduit connecting the tank and the vessel, means for heating the contents of the water vessel comprising a convection heating conduit connected to the bottom of the vessel thence extending externally to a position adjacent the top of the latter, and thence extending into the vessel in sealed relation therewith and terminating at a position spaced adjacent the bottom of the vessel, a combustion heater in the housing in heat exchange relation with a portion of the last-mentioned conduit external to the vessel, means at the uppermost part of the convection heating conduit for bleeding trapped gases from such conduit, and said vessel having an outlet adapted for connection to a shower nozzle.

2. The combination of claim 1, wherein the bleeding means is disposed at a position lower than the top of the vessel.

3. In a portable shower structure, a pair of water vessels in side-by-side relationship, a closable inlet conduit connected to the tops of both vessels, an outlet conduit communicating between the bottoms of said vessels, said outlet conduit having a lateral branch adapted for connection to a shower nozzle, pressure relief means for the vessels, a convection heating conduit connected to the bottom of one of the vessels, thence extending externally of the vessels to a connection with one of the vessels adjacent the top of the latter, means for heating the convection heating conduit at a position external to the vessels, means for removing trapped gases from the convection heating conduit, an air tank connected to one of the vessels, and a pump for forcing air into the air tank.

4. In a portable shower structure, a pair of water vessels in side-by-side relationship, a closable inlet conduit connected to the tops of both vessels, an outlet conduit communicating between the bottoms of said vessels, said outlet conduit having a lateral branch adapted for connection to a shower nozzle, a convection heating conduit connected to the outlet conduit intermediate one of the vessels and the lateral branch of the outlet conduit, thence extending externally of the vessels to a position adjacent the top of said one vessel and thence extending into the vessel in sealed relation therewith and terminating at a position spaced adjacent the bottom of the vessel.

References Cited in the file of this patent
UNITED STATES PATENTS

| | | |
|---|---|---|
| 22,298 | Mansfield | Dec. 14, 1858 |
| 133,702 | Foote | Dec. 10, 1872 |
| 689,164 | Castle | Dec. 17, 1901 |
| 2,465,853 | Dalton | Mar. 29, 1949 |
| 2,567,506 | Bowman | Sept. 11, 1951 |

FOREIGN PATENTS

| | | |
|---|---|---|
| 419,713 | Great Britain | Nov. 6, 1934 |